Feb. 26, 1957 C. A. HELBER 2,782,701
PHOTOGRAPHIC FILM TRANSPORT MECHANISM
Filed Oct. 23, 1953 3 Sheets-Sheet 1

INVENTOR.
Carl A. Helber
BY
A H Oldham
ATTORNEY

INVENTOR.
Carl A. Helber
BY
ATTORNEY

Feb. 26, 1957 C. A. HELBER 2,782,701
PHOTOGRAPHIC FILM TRANSPORT MECHANISM
Filed Oct. 23, 1953 3 Sheets-Sheet 3

INVENTOR.
Carl A. Helber
BY
A. H. Oldham
ATTORNEY

United States Patent Office 2,782,701
Patented Feb. 26, 1957

2,782,701

PHOTOGRAPHIC FILM TRANSPORT MECHANISM

Carl A. Helber, Maple Heights, Ohio, assignor to Goodyear Aircraft Corporation, Akron, Ohio, a corporation of Delaware Application October 23, 1953, Serial No. 387,867

1 Claim. (Cl. 95—31)

This invention relates to the improvement of a photographic film transport mechanism and in particular to a mechanism used for transporting in intermittent fashion a strip of such film through a gate.

A mechanism of this type is used for taking radar pictures at certain intervals from a flying airplane or guided missile, and also for map matching purposes whereby a radar picture is closely matched with a corresponding picture or map previously taken from the same elevation. For such purpose it is essential that the photographic film transported through a film gate at electrical command is positioned with great precision and reliability not obtainable to such a degree with mechanisms such as Geneva cams, Scotch yokes and claws to provide intermittent motion.

It is the general object of the invention to avoid and overcome the foregoing and other difficulties of and objections to prior art practices by the provision of a device capable of positioning the film strip longitudinally, as well as transversely, with greatest precision.

Another object of the invention is to prevent all backlash motion of the film and to keep it in taut condition at all times.

The aforesaid objects of the invention, and other objects which will become apparent as the description proceeds, are achieved by providing a system of slip clutches, two of which are driven continuously by a small electric motor to transport the strip film in an intermittent fashion. A sprocket wheel and slip clutch escapement released by a magnetically operated escapement lever is used to control the transport of the film which travels from a slip clutch-engaged take-off spool over an idling roller through a gate, and over the sprocket wheel to a wind-up spool. The sprocket wheel reel and the wind-up reel are actuated intermittently by separate slip clutches both of which are continuously driven by the motor through a worm gear drive.

Figure 1:
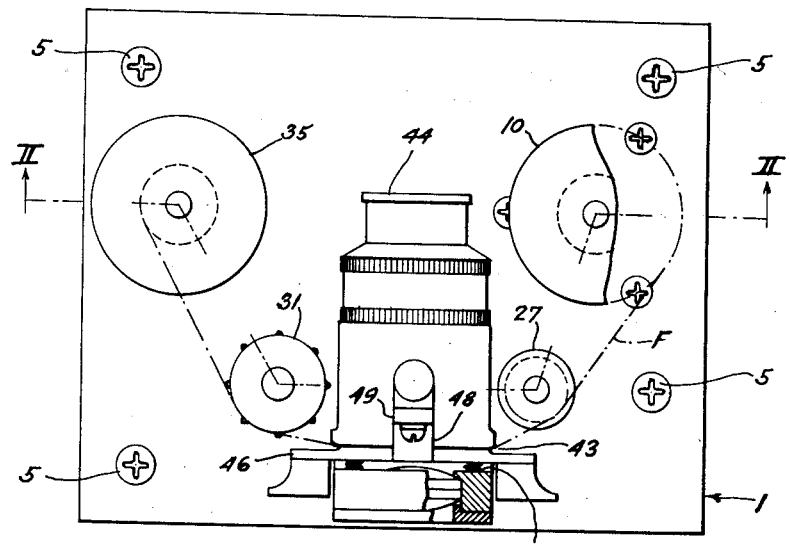
Figure 2:
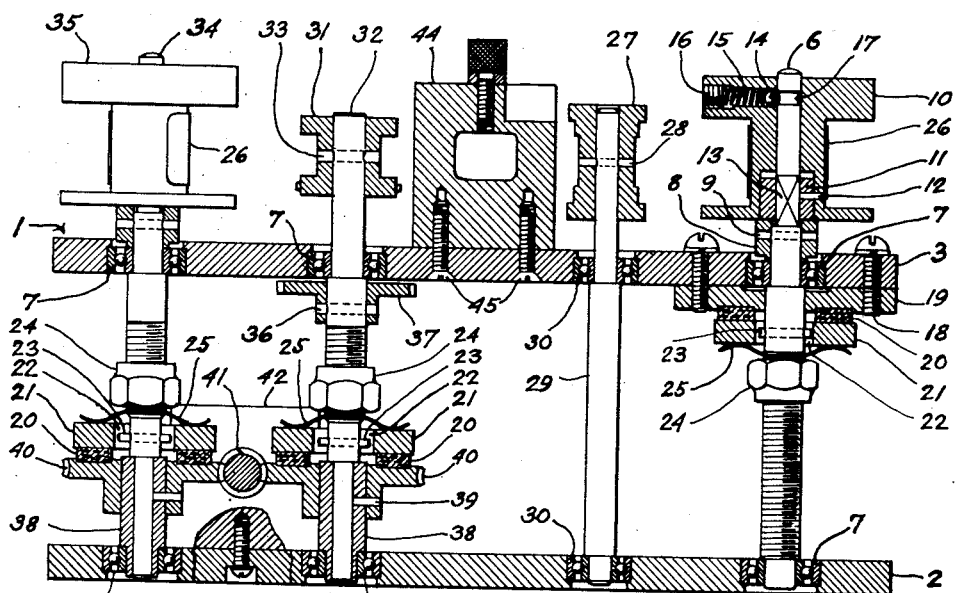
Figure 3:
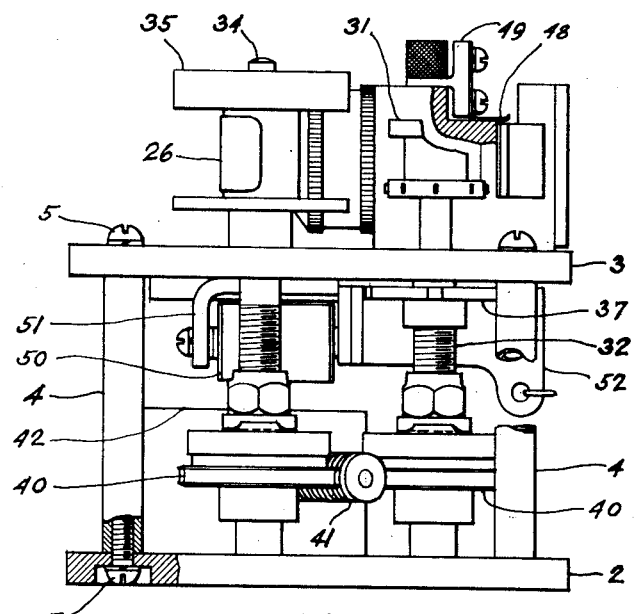
Figure 4:
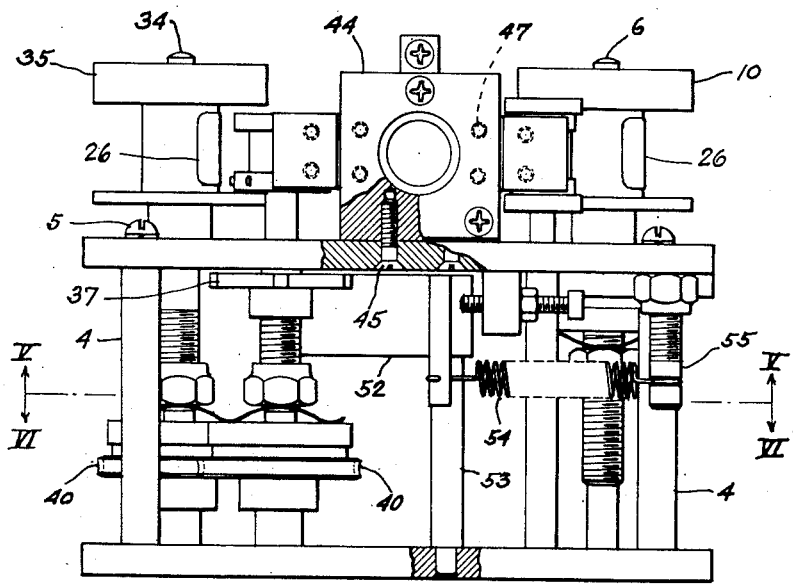
Figure 5:
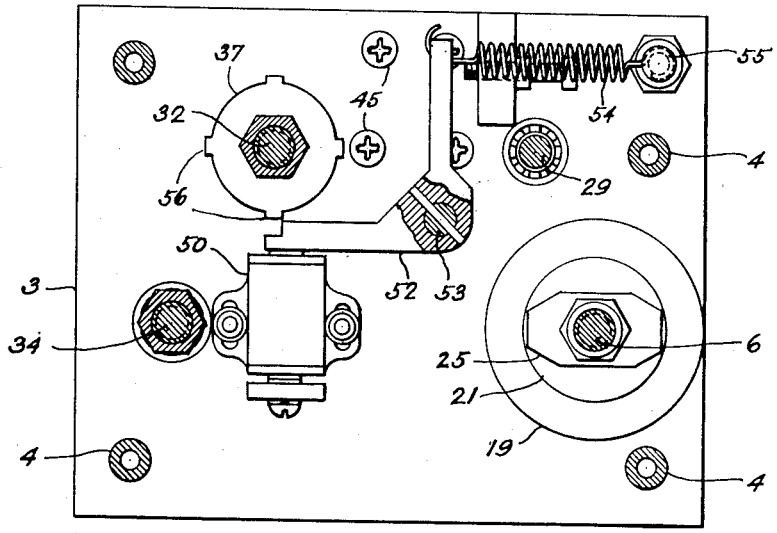
Figure 6:
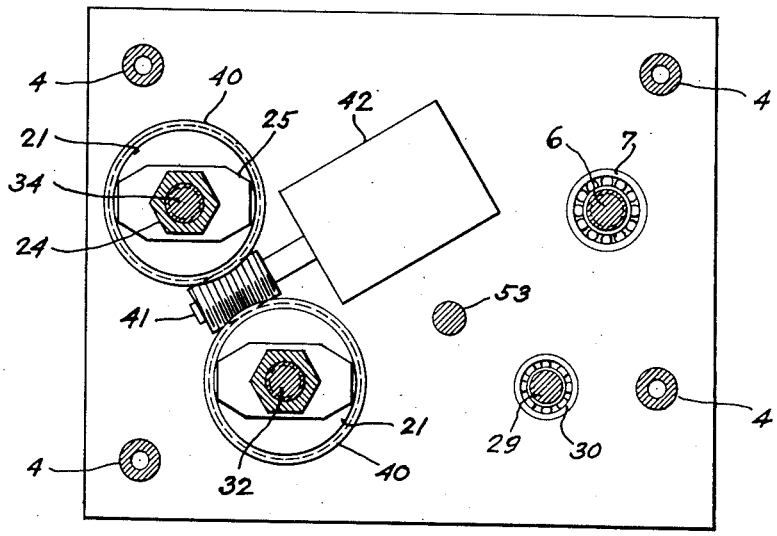

For a better understanding of the invention reference should be had to the accompanying drawings, wherein:

Fig. 1 is a top view, partly in cross-section, of one embodiment of the invention, Fig. 2 is a vertical, transverse cross-sectional view taken on line II—II of Fig. 1, Fig. 3 is a side view, Fig. 4 is a front view, Fig. 5 is a horizontal cross-sectional view taken on line V—V of Fig. 4, and Fig. 6 is a horizontal cross-sectional view taken on line VI—VI of Fig. 4.

With specific reference to the form of the invention illustrated in the drawings the numeral 1 indicates in general a frame of a film strip magazine consisting of a bottom plate 2 and a top plate 3 spaced apart by posts 4 and held together by screws 5. On the frame 1 is mounted a film take-off reel shaft 6 rotatable in bearings 7 seated, respectively, in the bottom plate 2 and top plate 3. To the upper portion of shaft 6, extending beyond frame plate 3, is mounted and spaced from the frame 1 by a distance piece 8 secured to the shaft by a pin 9, the film reel 10 which contains a bushing 11 fixed thereto by a pin 12 and slidably fitting over a square portion 13 of the shaft 6 to prevent the reel 10 from rotating about the shaft. The reel 10 is secured longitudinally on the shaft 6 by a ball 14 pressed by a spring 15 and screw 16 into an annular groove 17 provided in shaft 6, thus, making it possible to readily remove the reel 10 from its shaft. To the bottom face of the frame plate 3 is fastened by screws 18 a clutch plate 19 to which is secured a friction element 20, preferably made of cork, on which rides a friction disk 21 having a slot 22 engaging a pin 23 fastened in the shaft 6. A nut 24 threaded to the shaft 6 provides for pressure adjustment of the flat spring 25 to keep the clutch parts in proper frictional engagement. From the reel 10 the film F to be transported is attached thereto by a spring clip 26 and runs over an idler reel 27 fastened by a pin 28 to a shaft 29 rotatably mounted in bearings 30 inserted, respectively, in the frame plates 2 and 3. For transporting the film, a sprocket reel 31 engageable with the film strip perforations is fastened to a shaft 32 by a pin 33. The shaft 32 is rotatable in bearings 7 inserted, respectively, in the frame plates 2 and 3. Another shaft 34, carrying a wind-up reel 35 of the same construction and mounting as the film take-off reel 10, also is rotatable in bearings 7. Whereas, only shaft 32 has fixed thereto by a pin 36 an escapement or index wheel 37, both shafts, 32 and 34 have at their lower ends rotatably mounted sleeves 38 to which are fastened by pins 39 worm gears 40 in engagement with the worm shaft 41 driven by an electric D. C. motor 42 for continuous movement. The worm gears 40 have fixed to their upper side friction elements 20 in operative engagement with the friction disks 21 having diametrical slots 22 into which fit pins 23 fastened in the shafts 32 and 34 respectively, for turning therewith the disks 21. Adjustable nuts 24 press the flat springs 25 against the friction disks 21 for proper frictional engagement.

For operating the mechanism, the film strip F (see Fig. 1) wound upon the take-off reel 10 and carried over the idler spool 27 passes through the gate 43 of the projection lens mount 44 fastened by screws 45 to the upper frame plate 3. A plate 46 inserted in the gate 43 is pressed against the film F by springs 47 for film guidance. Also provided is a flat L-shaped spring 48 fastened to the holder 49 and retaining the film vertically in exact position while passing through the gate. The film, then, leads over the sprocket or driving reel 31 to the wind-up reel 35 to which it is fastened by a spring clip 26. For moving the film F intermittently, the motor 42 continuously running at approximately 10,000 R. P. M. drives through the worm shaft 41 the slip clutch worm gears 40 freely rotatable about the escapement shaft 32 and the wind-up reel shaft 34, respectively. By a very short electrical command a solenoid 50 supported by a bracket 51 attached to the upper frame plate 3 actuates the escapement lever 52 turnable together with pivot 53 against the tension of spring 54 anchored to the pin 55 and releases the escapement wheel 37 for rotation by the action of the slip clutch elements 20 and 21 just long enough so that the escapement lever released again from the solenoid 50 can engage the next tooth 56 of the escapement wheel 37. Such movement transports the film by means of the sprocket reel at each electrical command the desired distance with possibly greatest precision and winds it up on the wind-up reel 35, which also is driven from the motor 41 by means of the spring-loaded clutch elements 20 and 21.

From the aforesaid description it will be recognized that the objects of the invention have been achieved, for with each electric command the film in mesh with the sprocket reel can move intermittently only an arc corresponding to that between adjacent stop lugs of the escapement wheel, whereby the film is moved exactly the desired distance. Due to the fact that the take-off reel, the sprocket reel and the wind-up reel are all in engagement with slip clutches the film is always kept in taut condition without any backlash motion of the mechanism which is extremely simple and reliable in operation.

While certain representative embodiments and details have been shown for the purpose of illustrating the invention, it will be apparent to those skilled in this art that various changes and modifications may be made therein without departing from the spirit or scope of the invention.

What is claimed:

In a photographic film strip transport mechanism for intermittant film transport the combination of a supporting frame consisting of a bottom plate and a top plate spaced from each other, a projecting lens mount including a film gate fixed to the upper face of said top plate, a resiliently mounted plate inserted in said gate to exert slight pressure against the film face, a resilient film edge guide, a plurality of shafts each rotatably supported in pairs of bearings inserted in said bottom and top plates, and carrying, respectively, a film take-off reel, a film idling reel, a film sprocket reel, and a film wind-up reel, each reel being fixed to its respective shaft, slip clutch means mounted partly to the under side of said top plate and partly to said take-off reel shaft, an electric motor provided with a worm shaft and being mounted to said bottom plate, said motor being adapted to be continuously rotated, a pair of worm gears in simultaneous operative engagement with diametrically opposed portions of said worm shaft, one of said worm gears being rotatable about the sprocket reel shaft and the other worm gear about the wind-up reel shaft, slip clutch means engaging said worm gears with their respective shafts, an escapement wheel having a plurality of stop lugs and being fixed to said sprocket wheel shaft, a rigid, and spring-loaded escapement lever pivotally mounted in said frame tangential to said escapement wheel with an end thereof in arresting engagement with one of the escapement wheel lugs, said lever resisting under compression rotation of said sprocket, and an electro-magnetic relay for releasing by a short electric command said lever from said escapement wheel against the spring load for intermittent transport of the film driven by the sprocket reel a desired distance fixed by the circumferential distance between one stop lug and an adjacent stop lug of the escapement wheel.

References Cited in the file of this patent

UNITED STATES PATENTS

| 1,756,111 | Wisner | Apr. 29, 1930 |
| 1,932,691 | Cole | Oct. 31, 1933 |
| 1,988,486 | Ferenci | Jan. 22, 1935 |
| 2,136,209 | Finch | Nov. 8, 1938 |
| 2,569,031 | Warner et al. | Sept. 25, 1951 |

FOREIGN PATENTS

| 102,050 | Switzerland | June 17, 1922 |
| 875,728 | France | June 29, 1942 |
| 892,547 | France | Jan. 10, 1944 |